United States Patent [19]

Toutant

[11] Patent Number: 6,006,300

[45] Date of Patent: Dec. 21, 1999

[54] SYSTEM FOR ISOLATING HIGH-BAND-WIDTH SIGNALS TRANSMITTED BETWEEN LATENCY AND JITTER SENSITIVE DEVICES COUPLED TO A SECONDARY BUS FROM OPERATIONS ON A PRIMARY BUS

[75] Inventor: Roger P. Toutant, Port Coquitlam, Canada

[73] Assignee: International Business Machines Corporation, Armonk, N.Y.

[21] Appl. No.: 08/904,778

[22] Filed: Aug. 1, 1997

[51] Int. Cl.[6] ...................................................... G06F 13/14
[52] U.S. Cl. .............................. 710/126; 712/23; 712/210; 712/213
[58] Field of Search ............................... 395/821; 710/25, 710/113, 126, 129; 712/23, 210, 213

[56] References Cited

U.S. PATENT DOCUMENTS

| | | |
|---|---|---|
| 5,396,602 | 3/1995 | Amini et al. .............................. 395/325 |
| 5,555,383 | 9/1996 | Elazar et al. ............................. 395/306 |
| 5,564,026 | 10/1996 | Amini et al. .............................. 395/308 |
| 5,809,273 | 9/1998 | Favor et al. ............................. 395/386 |

*Primary Examiner*—Thomas C. Lee
*Assistant Examiner*—Abdelmoniem Elamin
*Attorney, Agent, or Firm*—Kenneth A. Seaman

[57] ABSTRACT

A multimedia terminal for processing multimedia signals having a host processor, latency, jitter insensitive and latency, jitter sensitive devices, and an isolation device between the latency and jitter insensitive devices and the latency and jitter sensitive devices operative to pass only low bandwidth signals is provided.

14 Claims, 2 Drawing Sheets

SYSTEM FOR ISOLATING HIGH-BAND-WIDTH SIGNALS TRANSMITTED BETWEEN LATENCY AND JITTER SENSITIVE DEVICES COUPLED TO A SECONDARY BUS FROM OPERATIONS ON A PRIMARY BUS

RELATED APPLICATIONS

The following patent applications are related to the application and are incorporated herein by reference:

| | | |
|---|---|---|
| Method And Apparatus For Controlling Elementary Stream Data Flow | 08/904,773 | 8/1/97 |
| Multiplexer for Multiple Media Streams | 08/904,813 | 8/1/97 |
| Frame Buffer for Multimedia Terminal | 08/904,819 | 8/1/97 |
| Internet Application Access Server Apparatus and Method | 08/905,197 | 8/1/97 |
| Network Communication Services Method and Apparatus | 08/904,939 | 8/1/97 |
| Method and Apparatus for Controlling Network Switches | 08/904,775 | 8/1/97 |
| Method and Apparatus for Maintaining Directory Services for a Video Transmission Network | 08/904,774 | 8/1/97 |
| Method and Apparatus for Controlling Access in a Video Distribution Network | 08/904,776 | 8/1/97 |
| Method and Apparatus for Controlling a Mixed Network of Analog and Digital Switches | 08/904,812 | 8/1/97 |

FIELD

The present invention relates to multimedia terminal systems (for example, multimedia desktop computers), and in particular, to such systems that must provide for the low-latency and low-jitter of multimedia data between processing devices within the terminal.

BACKGROUND

Multimedia terminals, such as multimedia desktop computers, consist of a variety of hardware and software modules. Hardware modules comprise physical devices, such as plug-in cards, that perform specific data and signal processing tasks, whereas software modules comprise microprocessor software code that executes either on microprocessors located on the hardware modules, or on the host microprocessor.

A typical use of a multimedia terminal is in the processing of analog and digital signals derived typically from external signal sources (e.g., a video camera), and from file servers (such files being the digitized versions of analog or digital signals). For example, a multimedia terminal might take an external analog video signal as an input, digitize it, compress it, then send it to a Network Interface Card (NIC) for transmission into a digital network (for eventual reception by another multimedia terminal that would perform the inverse operation of sending the decoded video signal to an analog television monitor).

Multimedia signals are typically high-bandwidth, and time-sensitive, in nature. For example, an increasingly popular video compression scheme is commonly known as MPEG-2 (Motion Picture Experts Group)(International Standards Organization (ISO) 13818-1). An instance of such a video compression card inside a multimedia terminal may generate a bit-rate in excess of 4,000,000 bits per second, which is a high-bandwidth signal. The signal is also time-sensitive in nature, meaning the Presentation Time Stamps (PTS) embedded in the MPEG-2 Transport Stream (TS) must be processed by the terminal with a minimum amount of jitter. Jitter, in analog communication, is a distortion caused by a signal's variation from its reference timing causing errors in data transmission. This variation in amplitude, time, frequency or phase of the signal and may be caused by background noise. Jitter, causing a change in phase of the signal, delays the signal. Reducing jitter thus implies a decrease in the maximum time that the video compression card has to wait to access the terminal data bus. This time is known as bus latency.

Although various implementations of multimedia terminals exist, no architectures specifically address the need of providing low-latency and low-jitter transmissions within the terminal. The need to provide such characteristics will increase as signal bandwidths increase (as is to be expected over time). As signal bandwidths increase, there is an increase in high frequency noise which results in higher jitter and thus higher latency. For example, it is not inconceivable that very high bandwidth network connections (in excess of hundreds of mega-bits per second) will be available to the average person at home within a few short years. The provision of very high bandwidth networks will place demands on multimedia terminals and the technologies used within the terminals to facilitate the processing and transmission of multimedia signals for low-jitter and low latency transmission.

Present implementations typically place the multimedia processing devices on a main bus inside the terminal. FIG. 1, below, shows a typical implementation whereby all devices are placed on a Peripheral Component Interconnect (PCI) bus 30. The PCI bus is an increasingly popular bus technology that permits the transmission of high-bandwidth signals and low-bandwidth signals. In FIG. 1, there are four devices shown connected to the PCI bus 30: a host processor 20, an auxiliary device 12, a multimedia processing device 14, and a network interface card (NIC) 16. Inside the host processor is shown a bus arbiter 18 that manages device access to the PCI bus 30.

In this example, all the devices 12, 14 and 16 communicate with the host processor 20 via the PCI bus 30 because the host processor 20 is responsible for configuring, controlling and managing the operation of the devices. Such communication signals can be low-bandwidth, or high-bandwidth in nature. For example, the auxiliary device 12 could be a video card, another type of NIC, or an Industry Standard Architecture (ISA) Bus-to-PCI Bridge.

The multimedia processing device 14 shown in this example processes external multimedia signals (such as analog or digital baseband video and audio signals) using MPEG-2 compression and decompression and sends/receives MPEG-2 data to/from the NIC 16. Therefore, the multimedia processing device 14 requires low-latency and low-jitter transmission of processing signals to/from the NIC 16 via the PCI bus 30.

The auxiliary device 12 may process signals that are quite unrelated to the signals processed by the multimedia processing device 14. However, both devices share the same PCI bus 30. When the auxiliary device 12 has data to send to/from the host processor 20, it will request access to the PCI bus 30 and will be eventually granted access by the bus arbiter 18. While the auxiliary device 12 has sole use of the PCI bus 30, the mulrimedia processing device 14 must hold-off sending data because the PCI bus 30 can serve only one device at a time. This holding-off introduces latency, and consequently, signal jitter in the data to be sent to/from the host processing device 14 from/to the NIC 16.

SUMMARY OF THE INVENTION

As signal bandwidths increase in multimedia terminals, reducing latency and jitter imposed upon signals transmitted within the terminals is becoming increasingly important. Present architectures do not isolate multimedia, time-sensitive signals from other, or unrelated signals, resulting in a negative impact on signal transmission, and consequently terminal performance. This invention arises from a recognition that improved performance could result from isolating the two types of signals.

According to the invention there is provided a multimedia terminal for processing multimedia signals such as video and audio signals. The multimedia terminal has a host processor, latency and jitter insensitive and latency and jitter sensitive devices, and an isolation device between the latency and jitter insensitive devices and at least some of the latency and jitter sensitive devices is operative to pass primarily low bandwidth signals.

The multimedia terminal may include a primary PCI bus, a host processor coupled to the PCI bus, a secondary PCI bus, an isolation device that may be a PCI-to-PCI bus bridge (PPB) coupling the primary PCI bus to the secondary PCI bus. High bandwidth video and audio signals may be transmitted between latency and jitter sensitive multimedia devices on the secondary PCI bus which is isolated from the primary PCI bus.

The PCI-to-PCI bus bridge (PPB) provides for the bridging of data across the primary and secondary buses, thus enabling the host processor to configure and manage all devices on both buses, and at the same time isolating these devices on the two buses. As a result, latency and jitter imposed upon the multimedia signals on the secondary PCI bus is minimized.

The multimedia devices may be selected from the group consisting of an encoder card, a decoder card and an ATM network interface card. Data communicating devices may be coupled to the primary PCI bus.

Preferably, the data passing through said PCI bridge is low bandwidth data.

In another aspect of the invention there is provided a method of processing multimedia signals such as video and audio signals in a terminal, which includes coupling a host processor and latency and jitter insensitive devices to a primary PCI bus, coupling latency and jitter sensitive multimedia devices to a secondary PCI bus, and coupling the primary and secondary PCI buses by a bus bridge so as to permit passage thereacross of primarily low bandwidth signals. In this way, high bandwidth video and audio signals transmitted between multimedia devices are isolated from control and data signals to and from the processor.

The invention relies upon the use of a bus bridge (BB) to provide an isolated bus over which the multimedia, time-sensitive signals can be transmitted with a minimum degree of interference (delay) from other signals. Bus bridges are commonly available for the PCI bus. In fact, some desktop computers incorporate the bus bridges in their architectures. The multimedia processing devices can be configured within a multimedia terminal by using such a bus bridge so as to isolate the multimedia signals from other signals. In this manner, the time-sensitive multimedia signals are isolated from impacting on the activity on other buses in the multimedia terminal.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
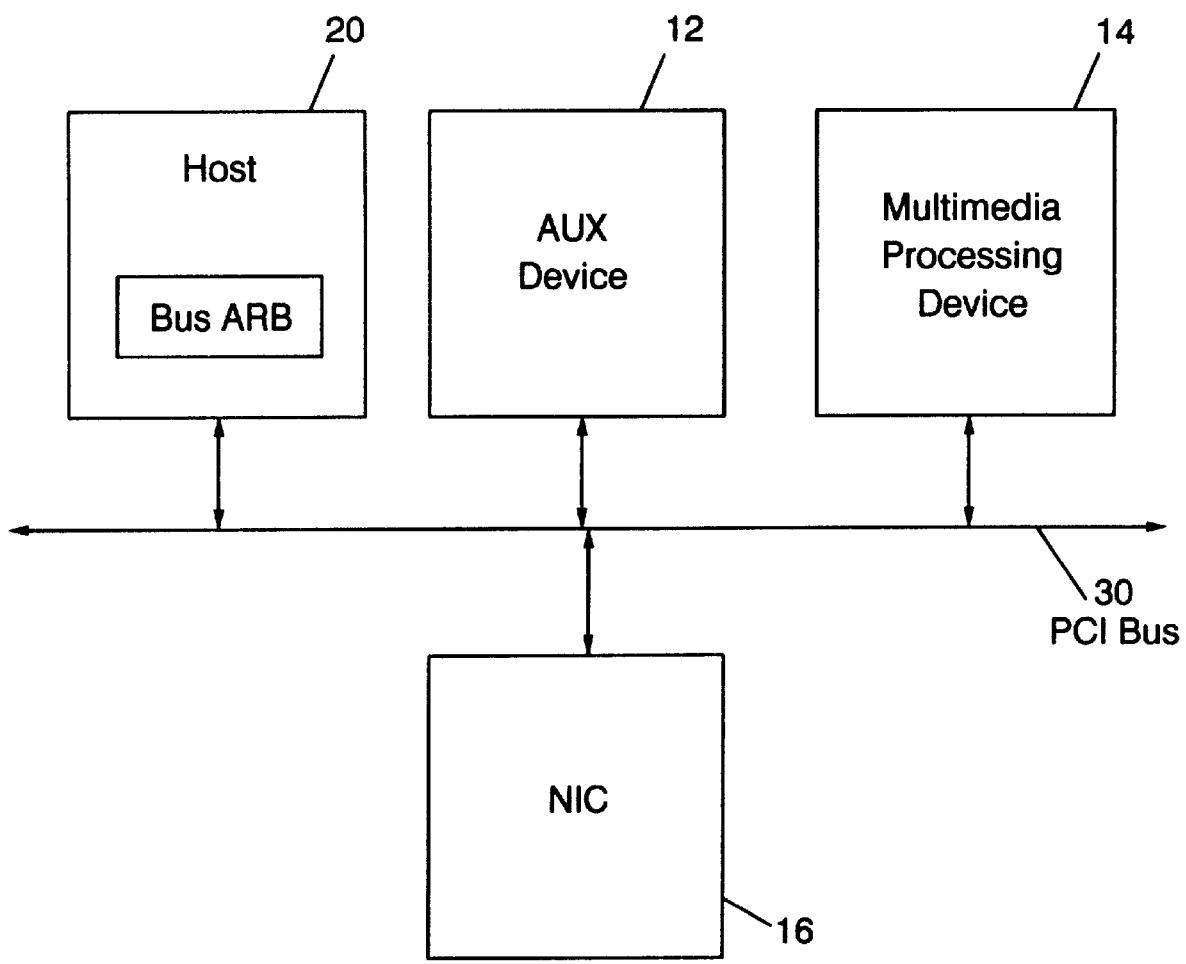
FIG. 1 is a schematic diagram showing a known multimedia terminal configuration.

FIG. 1 is a representation of a prior art system and is described above in connection with the Background section.

Figure 2:
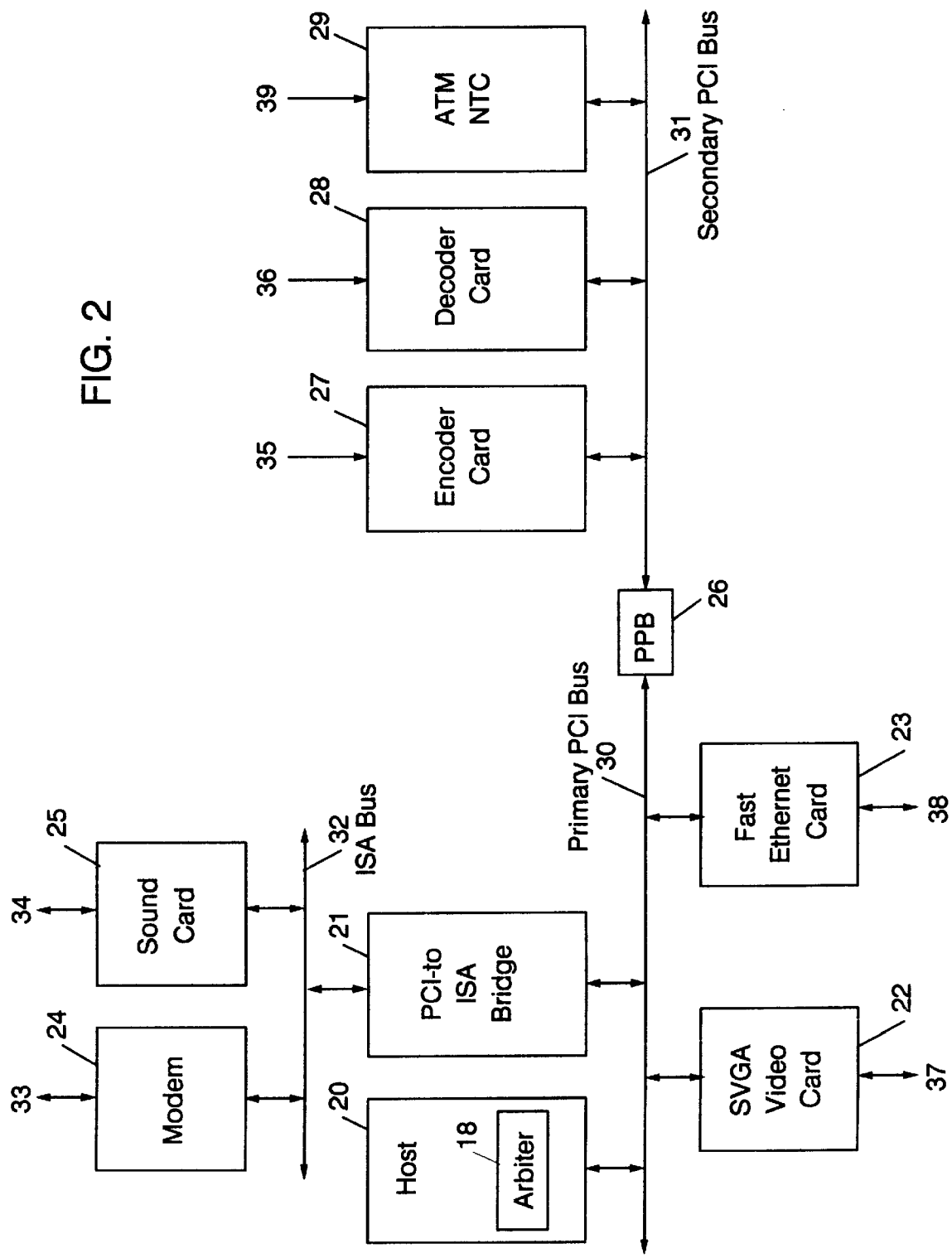
FIG. 2 is a schematic diagram showing the multimedia terminal configuration in accordance with a preferred embodiment of the present invention.

Referring to FIG. 2, which depicts an outline of the bus architecture of the multimedia terminal, it can be seen that the terminal comprises a host processor 20 (which contains a PCI bus arbiter 18), an Industry Standard Architecture (ISA) bus 32, a primary PCI bus 30, and a secondary PCI bus 31 bridged to the primary PCI bus by a PPB 26.

Various devices, 41, 42, 43, as described below, are shown connected to the ISA bus 32, the primary PCI bus 30 and the secondary PCI bus 31 in order to depict a possible terminal configuration.

The host processor 20 configures and manages all the devices in the multimedia terminal. The primary PCI bus arbiter 18 is shown as part of the host processor 20. Connected to the primary PCI bus 30 are three other devices 21, 22, 23. These devices are a PCI-to-ISA bridge 21 which provides support for legacy ISA cards. The SVGA Video Card 22 provides a Red-Green-Blue video signal 37 for input to a standard computer monitor. The Fast Ethernet Card 23 accepts an external fast ethernet signal 38 (100Base-TP signal that transmitts 100 MHz baseband in a twisted pair conducting medium as the transmission method, for example) from a fast ethernet hub that would connect via line 38.

Connected to the ISA bus 32 is a plain old telephone (POTS) or Integrated Services Digital Network (ISDN) modem 24. The modem 24 connects to the telephone network via line 33. The sound card 25, also connected to the ISA bus 32, provides for the processing of local audio signals via line 34.

The PPB 26 acts as the bridge between the primary PCI bus 30 and the secondary PCI bus 31. The PPB 26 examines the data on the buses and, if the addresses associated with the data indicate that the data is meant for transfer across the PCI-to-PCI bridge 26, the PPB 26 transfers it. The PPB 26 is aware of the addresses on the primary and secondary sides. These addresses are configured typically at power on. As part of the PCI protocol, the devices on the primary and secondary PCI buses 30 and 31, respectively, are given address ranges and a base address by the host BIOS (Basic Input Output System) when the host processor 20 is powered-on, or after it is reset. Per the PCI protocol, the cards inform the host processor 20 during the configuration stage how much address space they need. The PPB 26 permits the host processor 20 to configure and control the devices on the secondary PCI bus 31.

Connected to the secondary PCI bus 31 are three devices, namely, an encoder card 27, a decoder card 28, and an Asynchronous Transfer Mode Network Interface Card (ATM NIC) 29. The encoder card 27 accepts base-band multimedia (analog or digital audio and/or video) signals from an external device (such as a video cassette recorder) via line 35. The encoder card 27 processes the multimedia signals using MPEG-2 compression. Then, the encoder card 27 transmits the resulting processed signals to the ATM NIC 29 via the secondary PCI bus 31. The ATM NIC 29, in turn, sends the signals to an ATM network via line 39. The ATM NIC 29 also receives signals from the ATM network via line 39, and transmits them to the decoder card 36. The decoder card 28 processes the data using MPEG-2 decompression and then sends the decoded baseband multimedia (analog or digital audio and/or video) signals to an external device (such as a television monitor) via line 36.

DESCRIPTION OF OPERATIONAL SCENARIO

During the operation of a multimedia terminal, the data traffic on the primary and secondary PCI buses 30 and 31, respectively, are isolated by the PPB 26. Bus activity on the primary PCI bus 30 could be quite heavy. Consider that the Fast Ethernet Card 23 could be receiving and transmitting data at 100 mega-bits per second to and from the host processor 20 via the primary PCI bus 30. At a 33 MHz PCI bus clock rate, that amount of data consumes 20% of the primary bus bandwidth for a full-duplex operation of the Fast Ethernet Card 23. The host processor 20 could also be sending high-bandwidth video information to the SVGA Video Card 22. The modem 24 and sound card 25 could also be consuming considerable amounts of primary PCI Bus bandwidth due to the inefficiencies in PCI-to-ISA bridge implementations.

All the primary PCI bus activity would negatively impact devices connected to the primary PCI bus 30 if devices such as the encoder card 27, decoder card 28 and ATM NIC 29 required low-latency and low-jitter signal transmission across the primary PCI bus 30, The PPB 26, however, permits these devices and their associated signals to be isolated.

With the PPB 26 as shown in FIG. 2, the encoder card 27, decoder card 28 and ATM NIC 29 have full utilization of secondary PCI Bus 31, thus, minimizing the interference of signals generated by devices on the primary PCI bus 30. When the encoder card 27 is ready to transmit processed data to the ATM NIC 29, it requests access to the secondary PCI bus 31. The secondary bus arbiter (not shown but usually contained within the PPB 26) grants bus access to the encoder card 27 per the specific arbitration methodology (which is system implementation dependent). The encoder card 27 is then free to transmit data to the ATM NIC 29. The same process applies when the ATM NIC 29 is ready to send data to the decoder card 28.

In this manner, through the use of the PPB 26, and the placement of the time-sensitive multimedia processing devices on the secondary PCI bus 31, low-latency and low-jitter transmission of signals between the devices can be provided.

Although the preferred embodiment has been described and illustrated above, those skilled in the art will appreciate that various changes and modifications do not depart from the spirit or essence of the invention. Accordingly, the scope of the present invention is limited only by the following claims.

We claim:

1. A multimedia terminal for processing multimedia signals such as video and audio signals, said multimedia terminal comprising:

(a) a primary PCI bus with a plurality of devices coupled thereto;

(b) a host processor coupled to said primary PCI bus to control the devices on the primary bus;

(c) a secondary PCI bus;

(d) at least one bus bridge coupling said primary PCI bus to said secondary PCI bus enabling the host processor to control devices on the secondary PCI bus; and (e) a plurality of latency and jitter sensitive multimedia processing devices coupled to said secondary PCI bus for interoperation between at least two of the multimedia processing devices isolated from operation on the primary PCI bus by said bus bridge;

whereby high-bandwidth video and audio signals transmitted between the multimedia processing devices are isolated from data and control signals to and from said processor on the primary bus.

2. A multimedia terminal as defined in claim 1, wherein said bus bridge coupling said primary PCI bus and said secondary PCI bus is operative so as to bridge data across said primary and secondary buses.

3. A multimedia terminal as defined in claim 2, wherein the data passing through said bus bridge is low bandwidth data.

4. A multimedia terminal as defined in claim 1, wherein said multimedia devices are selected from a group consisting of an encoder card, a decoder card and a network interface card.

5. A multimedia terminal as defined in claim 1, including data communicating devices coupled to said primary bus.

6. A multimedia terminal as defined in claim 5, wherein said data communicating devices are selected from a group consisting of a video card, an ethernet card, and a bridge.

7. A multimedia terminal as defined in claim 1, wherein said primary bus is a PCI bus.

8. A multimedia terminal having a host processor controlling both latency and jitter insensitive and latency and jitter sensitive devices comprising: a first and a second bus with the host processor and said latency and jitter insensitive devices on the first bus and at least some of said latency and jitter sensitive devices on the second bus, an isolation device between the two buses that allows interoperation between the at least some of said latency and jitter sensitive devices isolated from operations on said first bus, said isolation device operative to pass primarily low bandwidth signals including those of the host processor from said first bus to said second bus.

9. A terminal according to claim 8, said one bus is a primary PCI bus coupled to said latency and jitter insensitive devices, said other bus is a secondary PCI bus coupled to at least some of said latency and jitter sensitive devices and said isolation device is a PCI-to-PCI bridge coupling said primary PCI bus to said secondary PCI bus.

10. A method of processing multimedia signals such as video and audio signals in a terminal, comprising:

(a) coupling a host processor and latency and jitter insensitive devices to a primary PCI bus;

(b) coupling latency and jitter sensitive multimedia devices to a secondary PCI bus for operation of the latency and jitter insensitive devices independent of operations on said first bus;

(c) coupling the primary and secondary PCI buses by a bus bridge permitting passage thereacross of primarily low bandwidth data but isolating the interoperation of the latency and jitter sensitive devices from operations in the first bus;

whereby high bandwidth video and audio signals transmitted between multimedia devices are isolated from data signals to and from said processor.

11. A terminal according to claim 10, including a primary bus coupled to said latency and jitter insensitive devices, a secondary bus coupled to at least some of said latency and jitter sensitive devices and wherein said isolation device is a bus bridge coupling said primary bus to said secondary bus.

12. A terminal according to claim 11, wherein the primary bus is a PCI bus, the secondary bus is a PCI bus and the bus bridge is a PCI-to-PCI bus.

13. A method of processing multimedia signals such as video and audio signals in a terminal having a host processor, a primary bus and a secondary bus, and comprising:

(a) coupling a host processor and latency and jitter insensitive devices to a primary bus;

(b) coupling latency and jitter sensitive multimedia devices to a secondary bus;

(c) coupling the primary and secondary buses by a bus bridge so as to permit passage thereacross of primarily low bandwidth data;

whereby high bandwidth video and audio signals transmitted between multimedia devices are isolated from data signals to and from said processor.

14. A method according to claim 13, wherein the multimedia devices are selected from the group consisting of an encoder card, a decoder card and a network interface card.

* * * * *